US012650684B2

(12) United States Patent
Lai et al.

(10) Patent No.: US 12,650,684 B2
(45) Date of Patent: Jun. 9, 2026

(54) SAFETY SYSTEM OF MECHANIC EQUIPMENT

(71) Applicant: TECHMAN ROBOT INC., Taoyuan City (TW)

(72) Inventors: Chun-Wen Lai, Taoyuan City (TW); Chih-Jan Kao, Taoyuan City (TW); Ching-Wei Lee, Taoyuan City (TW)

(73) Assignee: TECHMAN ROBOT INC., Taoyuan City (TW)

( * ) Notice: Subject to any disclaimer, the term of this patent is extended or adjusted under 35 U.S.C. 154(b) by 277 days.

(21) Appl. No.: 18/525,920

(22) Filed: Dec. 1, 2023

(65) Prior Publication Data

US 2025/0181063 A1 Jun. 5, 2025

(51) Int. Cl.
G05B 23/02 (2006.01)
B25J 19/06 (2006.01)

(52) U.S. Cl.
CPC .......... G05B 23/0224 (2013.01); B25J 19/06 (2013.01)

(58) Field of Classification Search
CPC ............................ G05B 23/0224; B25J 19/06
See application file for complete search history.

(56) References Cited

U.S. PATENT DOCUMENTS

| | | | | |
|---|---|---|---|---|
| 4,490,660 | A | * | 12/1984 | Tsuchihashi ............. B25J 19/06 |
| | | | | 318/563 |
| 4,697,979 | A | * | 10/1987 | Nakashima .............. B25J 19/06 |
| | | | | 901/6 |

| | | | | |
|---|---|---|---|---|
| 4,718,078 | A | * | 1/1988 | Bleidorn ............ G05B 19/4062 |
| | | | | 318/563 |
| 4,776,433 | A | * | 10/1988 | Lagree ..................... G05D 3/00 |
| | | | | 187/316 |
| 5,086,401 | A | * | 2/1992 | Glassman ................. A61F 2/46 |
| | | | | 606/88 |
| 5,271,092 | A | * | 12/1993 | Kreuzer ............... G05B 19/425 |
| | | | | 700/250 |
| 5,760,560 | A | * | 6/1998 | Ohya ................... G05B 19/425 |
| | | | | 901/45 |
| 6,778,867 | B1 | * | 8/2004 | Ziegler ................. B25J 9/1674 |
| | | | | 318/563 |
| 7,308,383 | B2 | * | 12/2007 | Zuzuly ..................... H04Q 9/00 |
| | | | | 702/182 |
| 7,562,261 | B2 | * | 7/2009 | Meyer-Grafe ........... G05B 9/03 |
| | | | | 714/48 |
| 7,781,922 | B2 | * | 8/2010 | Schafer .................... G05B 9/02 |
| | | | | 307/326 |
| 7,933,676 | B2 | * | 4/2011 | Schuster ............ G05B 19/4061 |
| | | | | 340/532 |
| 8,036,776 | B2 | * | 10/2011 | Hellberg ................ B25J 9/1674 |
| | | | | 700/250 |
| 8,285,402 | B2 | * | 10/2012 | Lueckenbach ..... G05B 19/0425 |
| | | | | 700/19 |
| 8,433,427 | B2 | * | 4/2013 | Glomann ........... G05B 23/0254 |
| | | | | 702/181 |

(Continued)

*Primary Examiner* — Bhavesh V Amin
(74) *Attorney, Agent, or Firm* — Winston Hsu

(57) ABSTRACT

A mechanical equipment comprises a control system and a safety system. The safety system is coupled to the control system, and the safety system monitors the operation of the mechanical equipment, and generates a first monitoring signal and a second monitoring signal according to a synchronization signal. The first monitoring signal and the second monitoring signal are obtained by monitoring the mechanical equipment at the same monitoring time.

3 Claims, 6 Drawing Sheets

(56) References Cited

U.S. PATENT DOCUMENTS

| | | | | |
|---|---|---|---|---|
| 9,021,873 B2 * | 5/2015 | Shikagawa | ............ | B25J 9/1674 |
| | | | | 73/121 |
| 10,295,439 B2 * | 5/2019 | Manahan | ............... | G08B 21/16 |
| 10,317,201 B2 * | 6/2019 | Dirschlmayr | .......... | B25J 9/1674 |
| 10,379,527 B2 * | 8/2019 | Jundt | ...................... | H04L 67/12 |
| 10,442,080 B2 * | 10/2019 | Muneto | .................. | B25J 9/1605 |
| 11,179,803 B2 * | 11/2021 | Mizuno | ............... | B23K 26/044 |
| 12,233,542 B2 * | 2/2025 | Roberts | .................... | B25J 18/06 |
| 12,301,144 B2 * | 5/2025 | Kimura | ................ | H02P 25/064 |
| 2003/0033052 A1 * | 2/2003 | Hillen | ................. | G05B 19/042 |
| | | | | 219/136 |
| 2004/0030452 A1 * | 2/2004 | Graf | ...................... | B25J 9/1682 |
| | | | | 700/245 |
| 2004/0153211 A1 * | 8/2004 | Kamoto | ................ | G06N 3/008 |
| | | | | 700/245 |
| 2005/0055132 A1 * | 3/2005 | Matsumoto | ........... | B25J 9/1682 |
| | | | | 700/245 |
| 2005/0166413 A1 * | 8/2005 | Crampton | ............. | G01B 11/03 |
| | | | | 33/503 |
| 2005/0187738 A1 * | 8/2005 | Zuzuly | ................... | H04Q 9/00 |
| | | | | 702/183 |
| 2007/0168077 A1 * | 7/2007 | Schuster | ........... | G05B 19/4061 |
| | | | | 700/170 |
| 2009/0083001 A1 * | 3/2009 | Huisenga | .......... | G05B 23/0224 |
| | | | | 702/185 |
| 2009/0177306 A1 * | 7/2009 | Bosga | .................. | B30B 15/148 |
| | | | | 901/6 |
| 2010/0174407 A1 * | 7/2010 | Fukawa | ............. | B23K 26/0884 |
| | | | | 901/14 |
| 2010/0217434 A1 * | 8/2010 | Hellberg | ............... | B25J 9/1674 |
| | | | | 901/30 |
| 2011/0022214 A1 * | 1/2011 | Glomann | ........... | G05B 23/0254 |
| | | | | 700/108 |
| 2011/0071675 A1 * | 3/2011 | Wells | ................... | H04N 13/204 |
| | | | | 700/250 |
| 2012/0136587 A1 * | 5/2012 | Nagathil | ........... | G05B 23/0224 |
| | | | | 702/34 |
| 2012/0255938 A1 * | 10/2012 | Oe | ..................... | B23K 26/0884 |
| | | | | 901/41 |
| 2014/0077775 A1 * | 3/2014 | Gotou | ................... | G01R 31/40 |
| | | | | 323/234 |
| 2014/0236894 A1 * | 8/2014 | Hoffman | ............... | A61B 34/37 |
| | | | | 707/631 |
| 2015/0285281 A1 * | 10/2015 | Gehrke | .................. | F16P 3/144 |
| | | | | 137/455 |
| 2017/0146413 A1 * | 5/2017 | Ibrocevic | ................ | B25J 19/06 |
| 2017/0315525 A1 * | 11/2017 | Brausen | ............. | G05B 19/042 |
| 2019/0061054 A1 * | 2/2019 | Mizuno | ................ | B25J 9/1684 |
| 2019/0105788 A1 * | 4/2019 | Pilz | ....................... | B25J 9/1676 |
| 2019/0162588 A1 * | 5/2019 | Deverell | ............... | G01H 1/006 |
| 2019/0227532 A1 * | 7/2019 | Keselman | ............. | B25J 11/005 |
| 2019/0270199 A1 * | 9/2019 | Ning | ................... | G05B 19/423 |
| 2021/0001499 A1 * | 1/2021 | Hitz | ...................... | G01R 31/11 |
| 2022/0167553 A1 * | 6/2022 | Rogö | ................... | G05D 1/0265 |
| 2022/0168893 A1 * | 6/2022 | Hamilton | ............. | B25J 9/1666 |
| 2022/0398454 A1 * | 12/2022 | Park | ...................... | G06N 5/04 |
| 2025/0181063 A1 * | 6/2025 | Lai | .................... | G05B 23/0224 |

* cited by examiner

SAFETY SYSTEM OF MECHANIC EQUIPMENT

FIELD OF THE INVENTION

The present application is related to a safety system, in particular to a safety system of a mechanic equipment for improving the accuracy of monitoring.

BACKGROUND OF THE INVENTION

General mechanic equipment, such as robotic arms, uses a safety system to monitor whether an operation of the robotic arm has complied with safety regulations, such as ISO 13849-1:2015 Category 2. Further, the existing techniques often integrate the safety system and the control system into a single system and use a single control system to control the arm to perform tasks and control the monitoring and calculation of the safety system or whether to activate the safety mechanism to limit the movement of the robotic arm, etc., such as Safety specification IEC 61508-6:2010 1001. However, this integrated design causes the safety system to be unable to function for monitoring the operation of mechanic equipment when an abnormality occurs in the control system, which does not meet safety requirements. Moreover, the operation of the safety system will also interfere with the data transmission performance of the control system.

Based on the above problems, the present application provides a safety system of a mechanic equipment to improve the data transmission performance of the control system and the accuracy of the safety system's monitoring of the mechanic equipment.

SUMMARY OF THE INVENTION

An objective of the present application is to provide a safety system of a mechanic equipment, which adopts a dual-channel architecture to monitor the mechanic equipment.

An objective of the present application is to provide a safety system of a mechanic equipment, which uses a synchronization signal to control the accuracy of the data acquired by the safety system and thus judges the motion status of the mechanic equipment.

An objective of the present application is to provide a mechanic equipment comprising a control system and a safety system disposed independently for improving the data transmission performance of the control system.

To achieve the above-mentioned objectives, the mechanic equipment according to the present application comprises a control system and a safety system. The safety system is coupled to the control system. The safety system monitors an operation of the mechanic equipment and generates a first monitoring signal and a second monitoring signal according to a synchronization signal. The first monitoring signal and the second monitoring signal are acquired by monitoring the mechanic equipment at the same monitoring time.

Wherein, the control system comprises a first register circuit and a second register circuit for registering a first input data and a second input data. The mechanic equipment comprises a communication control module for controlling the control system to output the first input data or the second input data. The safety system comprises a first monitoring module and a second monitoring module. The first monitoring module is coupled to the first register circuit and the second monitoring module is coupled to the second register circuit via a communication port for receiving the first input data and the second input data sequentially. The first monitoring module and the second monitoring module comprise a synchronization circuit, respectively. The synchronization signal controls the synchronization circuits to trigger the first monitoring module and the second monitoring module to detect the status of the mechanic equipment at the same monitoring time for generating the first monitoring signal and the second monitoring signal. The safety system outputs the first output data and second output data according to the first monitoring signal and the second monitoring signal.

DETAILED DESCRIPTION OF THE INVENTION

In order to make the structure and characteristics as well as the effectiveness of the present application to be further understood and recognized, the detailed description of the present application is provided as follows along with embodiments and accompanying figures.

Figure 1:
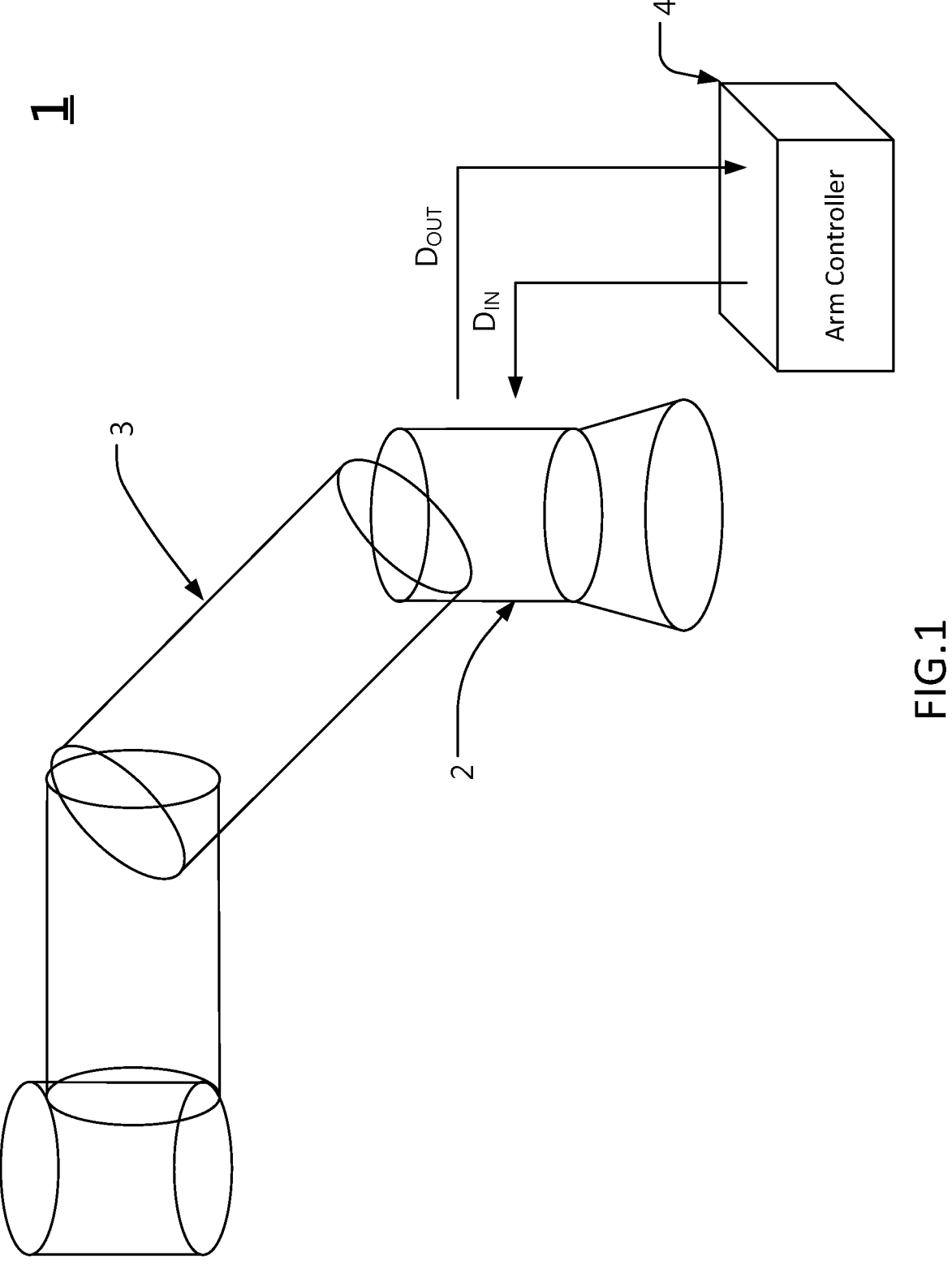
FIG. 1 shows a schematic diagram of the mechanic equipment and the arm controller according to the present application.

Please refer to FIG. 1, which shows a schematic diagram of the mechanic equipment and the arm controller according to the present application. According to an embodiment, the mechanic equipment can be a robotic arm 1, which comprises a plurality of joint modules 2 and armshaft modules 3. The robotic arm 1 and an arm controller 4 are connected electrically. As shown in the figure, the plurality of joint modules 2 of the robotic arm 1 are coupled to the arm controller 4. The arm controller 4 outputs the input data $D_{IN}$ to the joint modules 2. The joint modules 2 output the output data $D_{OUT}$ to the arm controller 4. The arm controller 4 can output a single set or multiple sets of input data $D_{IN}$ to each joint module 2. Likewise, each joint module 2 can output a single set or multiple sets of output data $D_{OUT}$ to the arm controller 4. The transmission amount of the input data $D_{IN}$ and the output data $D_{OUT}$ is determined by the requirements of the robotic arm 1 and the arm controller 4, for example, the requirements for single- or dual-channel safety surveillance or real-time monitoring.

Figure 2:
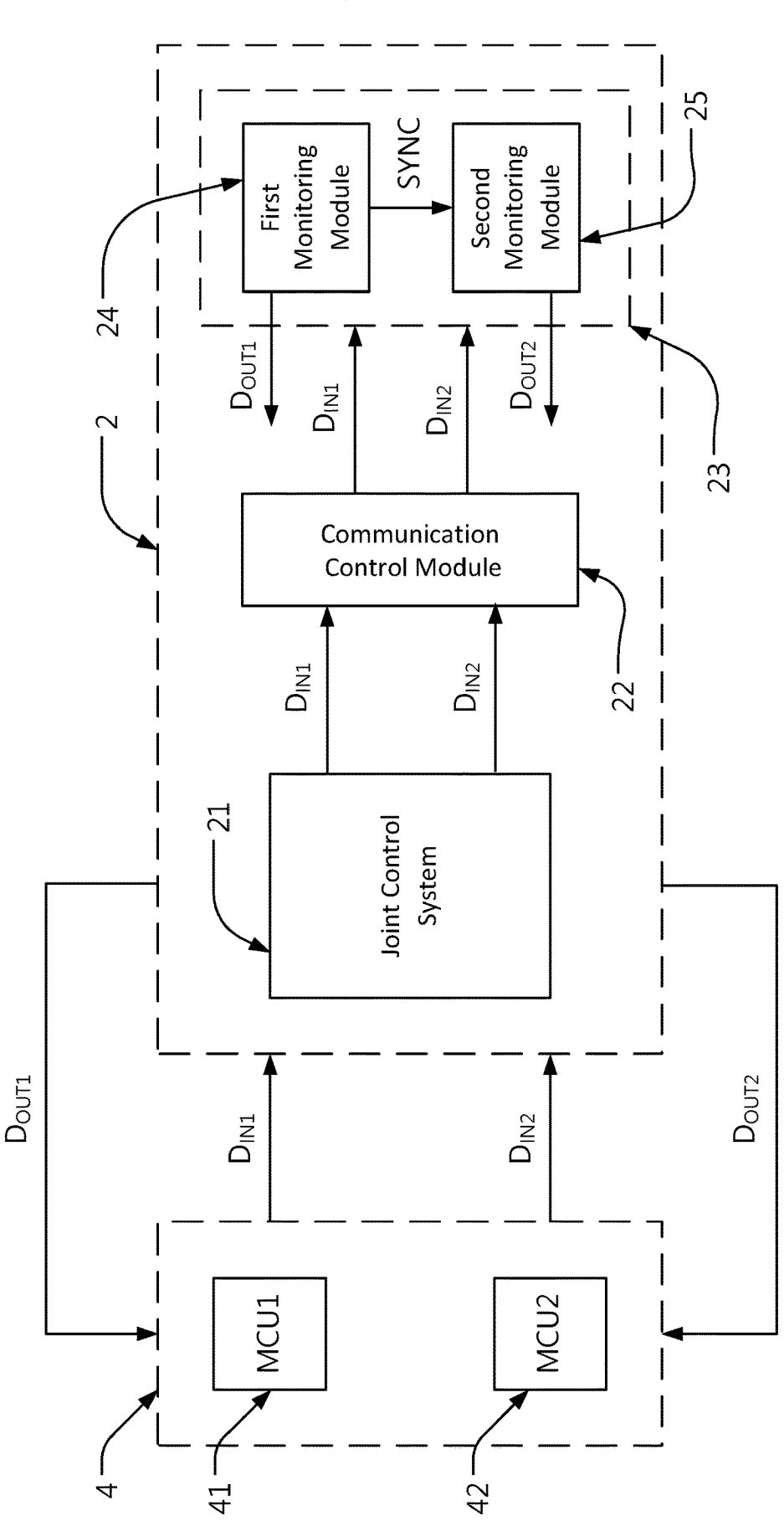
FIG. 2 shows a circuit diagram of the control system and the safety system of the joint module according to the present application.

Please refer to FIG. 2, which shows a circuit diagram of the control system and the safety system of the joint module according to the present application. The joint module 2 comprises the control system and the safety system. Since the control system and the safety system are disposed in the joint module 2, they can be called the joint control system 21 and the joint safety system 23. Nonetheless, the names are used for illustration only, instead of limiting the application scope of the control system and the safety system. As shown in the figure, the joint module 2 is coupled to the arm controller 4. In addition, according to the embodiment of FIG. 2, the circuit architecture is the dual channel for mutually transmitting a plurality of data. The arm controller 4 can comprise a first microcontroller 41 and a second microcontroller 42. The first microcontroller 41 and the second microcontroller 42 output first input data $D_{IN1}$ and second input data $D_{IN2}$ to the joint module 2, respectively. The joint module 2 outputs the first output data $D_{OUT1}$ and the second output data $D_{OUT2}$ by the joint control system 21 or the joint safety system 23.

The joint control system 21 drives the motor electric machine to control the joint module 2 to move the robotic arm 1. The joint safety system 23 is coupled to the joint control system 21 and monitors the operation of the robotic arm 1 for producing the first output data $D_{OUT1}$ and the second output data $D_{OUT2}$. Thereby, for the design of the joint safety system 23 without the capability of controlling the operation of the joint module 2, the first output data $D_{OUT1}$ and the second output data $D_{OUT2}$ produced by the joint safety system 23 will be transmitted to the joint control system 21 before being transmitted to the arm controller 4. Contrarily, for the design of the joint safety system 23 with the capability of controlling the operation of joint module 2, when the joint safety system 23 monitors the safety concerns of mechanic equipment, the joint safety system 23 controls the joint module 2 to stop the unsafe operations and transmits the related information (or data) to the arm controller 4, thus the arm controller 4 determines the modification of operation on the mechanic equipment. For example, when the joint safety system 23 detects insufficient operating voltage of the joint module 2, the operating speed of the mechanic equipment could be controlled to be lowered and the first output data $D_{OUT1}$ or the second output data $D_{OUT2}$ are transmitted to the arm controller 4 by the joint safety system 23. Then the arm controller 4 judges whether to stop the operation of the whole mechanic equipment and shows that maintenance is required; Alternatively, the low-speed operation can be used to finish the subsequent tasks.

Furthermore, according to the embodiment, the control system and the safety system of the joint module 2 are disposed independently. Thereby, the control system can mainly control the operation of the joint module 2; the safety system can mainly monitor and/or control the safe operation of the joint module 2. Please refer again to FIG. 2. The joint module 2 comprises a communication control module 22, which controls the data transmission of the joint control system 21 and the joint safety system 23, so that the data transmission of the joint control system 21 can be free from interference or obstruction of the data transmission of the joint safety system 23. In other words, when the joint safety system 23 is not performing data transmission, the joint control system 21 can perform data transmission, and thus improving the data transmission performance of the joint control system 21, and vice versa. The communication control system 22 is coupled to the joint control system 21 for notifying the joint control system 21 to output the first input data $D_{IN1}$ or the second input data $D_{IN2}$. Moreover, the communication control system 22 is coupled to the joint safety system 23 for notifying the joint safety system 23 to receive the first input data $D_{IN1}$ or the second input data $D_{IN2}$. Likewise, when the joint safety system 23 needs to transmit the first output data $D_{OUT1}$ or the second output data $D_{OUT2}$ to the joint control system 21 via the communication control module 22, the communication control module 22 can still control the timing of data transmission for avoiding an influence on the operating efficiency of the joint control system 21.

The mechanic equipment comprises a synchronization signal SYNC, which can be output from the arm controller 4 (such as MCU1 or MCU2), the joint control system 21, or the joint safety system 23. For example, when the synchronization signal SYNC is output from the joint safety system 23, the joint safety system 23 monitors the operation of the robotic arm 1 according to the synchronization signal SYNC. Since the joint safety system 23 adopts the dual-channel circuit architecture, the joint safety system 23 can monitor the operation of the robotic arm 1 at the same monitoring time to detect a first monitoring signal and a second monitoring signal. The first monitoring signal and the second monitoring signal can act as the first output data $D_{OUT1}$ and the second output data $D_{OUT2}$ upon detection of a value, such as the voltage value of the power supply, the current value of the motor, or the turns of the encoder. Alternatively, the first monitoring signal and the second monitoring signal are calculated and output by the joint safety system 23 to give the first output data $D_{OUT1}$ and the second output data $D_{OUT2}$, representing statuses such as low voltage, over current, or discrepancy between the operating speed and the setup value.

In addition, both logic operations and mathematical operations can be design options. The signal, data, information, voltage, or current according to the embodiments are description methods in different forms and will not influence the execution of the embodiments. When the first monitoring signal and the second monitoring signal are generated by the joint module 2, they can be named the first joint monitoring signal and the second joint monitoring signal.

Please refer to FIG. 2 again. A first monitoring module 24 or a second monitoring module 25 of the joint safety system 23 outputs the synchronization signal SYNC. For example, the first monitoring module 24 outputs the synchronization signal SYNC to the second monitoring module 25. Thereby, the first monitoring module 24 notifies the second monitoring module 25 to synchronously monitor the operating status, the circuit status, or the power supply status of the robotic arm 1. By using the first monitoring module 24 and the second monitoring module 25 to monitor synchronously, the accuracy of the monitored values (data or signals) can be improved, meaning that the monitoring accuracy of the safety system on the mechanic equipment can be enhanced accordingly. If the monitoring is performed asynchronously, due to possible circuit delay or control delay, the first monitoring module 24 might monitor the force applying status of the robotic arm 1 for the first 5 seconds while the second monitoring module 25 might monitor the force applying status of the robotic arm 1 for the last 5 seconds. Since the monitoring times differ by 5 seconds, the assessment of the operation of the robotic arm might be misled. Furthermore, the synchronization signal SYNC is processed by a synchronization circuit disposed in the joint safety system 23. For example, the monitoring module 24 and the second monitoring module 25 both comprise a synchronization circuit 28, 29, respectively, for generating and processing the synchronization signal SYNC.

In other words, the safety system monitors the operation of the mechanic equipment and generates the first monitoring signal and the second monitoring signal according to the synchronization signal SYNC. Besides, the first monitoring signal and the second monitoring signal are acquired by monitoring the mechanic equipment at the same monitoring time to judge the motion status of the mechanic equipment correctly. The synchronization signal of the joint module 2 can be called a joint synchronization signal. In addition, the dual-channel circuit architecture means that one channel comprises the first microprocessor 41, the circuit in control system related to the first input data $D_{IN1}$, the circuit of the communication control module 22 related to the first input data $D_{IN1}$, and the first monitoring module 24; the other channel comprises the second microprocessor 42, the circuit in control system related to the second input data $D_{IN2}$, the circuit of the communication control module 22 related to the second input data $D_{IN2}$, and the second monitoring module 25. If one of the channels is abnormal, the other channel maintains normal operation between the joint module 2 and the robotic arm 1 and prevents failure of tasks.

Figure 3:
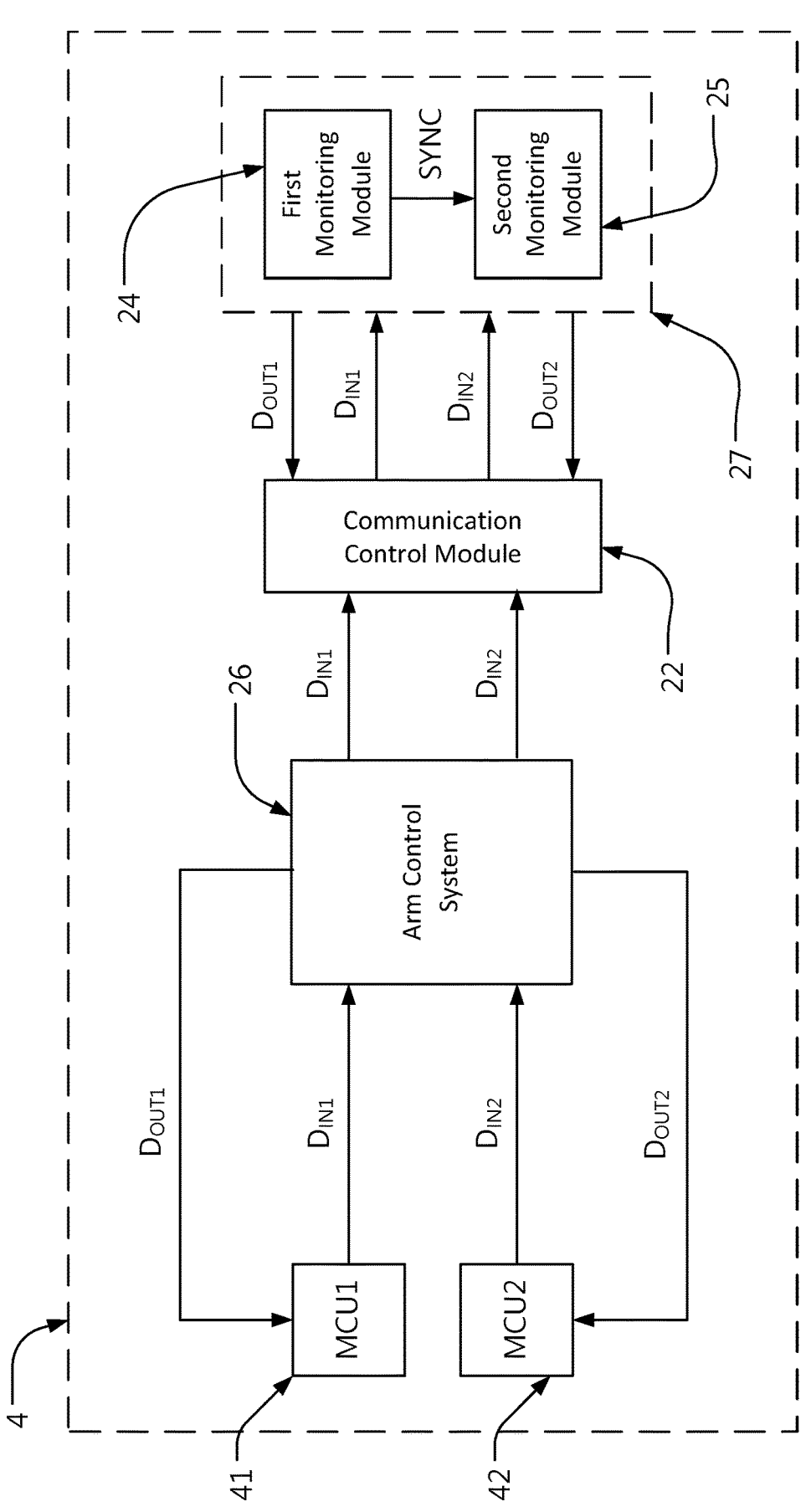
FIG. 3 shows a first circuit diagram of the control system and the safety system of the arm controller according to the present application.

Please refer to FIG. 3, which shows a first circuit diagram of the control system and the safety system of the arm controller according to the present application. In addition to being applied to the joint module 2 in FIG. 2, the control system and the safety system can also be applied to the arm controller 4. As shown in the figure, the control system and the safety system can be called the arm control system 26 and the arm safety system 27. Besides, the input data $D_{IN}$ and the output data $D_{OUT}$ according to the present embodiment are transmitted by the communication control module 22 and the arm control system 26 disposed between the first microprocessor 41, the second microprocessor 42, and the arm safety system 27. The input data $D_{IN}$ and the output data $D_{OUT}$ can comprise a single piece or multiple pieces of input data $D_{IN}$ and output data $D_{OUT}$. For example, the input data $D_{IN}$ comprises the first input data $D_{IN1}$ and the second input data $D_{IN2}$; the output data $D_{OUT}$ are similar. Moreover, when the arm safety system 27 detects that the operating position of the robotic arm 1 is inconsistent with the setting or the motion error is excessive, in addition to transmitting the monitoring values (or the operational result) to the first microprocessor 41 or the second microprocessor 42, the monitoring values (or the operational result) can further act as the input data $D_{IN}$ of the joint module 2 and then triggering each joint control system 21 to correct the driving on motor machines. For example, the first microprocessor 41, the second microprocessor 42, the arm control system 26, the communication control module 22, or the arm safety system 27 transmits the related monitoring values (or the operational result) to the joint control system 21 of the joint module 2. Thereby, when the joint module 2 and the arm controller 4 both comprise the control system and the safety system, if the joint module 2 returns the monitoring signal to the arm controller 4, the output data $D_{OUT}$ produced by the joint module 2 are just the input data $D_{IN}$ to the arm controller 4. For example, the safety system 23 of the joint module 2 in FIG. 2 produces the first output data $D_{OUT1}$ and the second output data $D_{OUT2}$ to the first microprocessor 41 and the second microprocessor 42 of the arm controller 4 in FIG. 3, acting as the first input data $D_{IN1}$ and the second input data $D_{IN2}$ (namely, the first joint monitoring signal and the second joint monitoring signal) of the arm controller 4 in FIG. 3.

Furthermore, when the output data $D_{OUT}$ (namely, the first monitoring signal and the second monitoring signal) produced by the arm controller 4 act as the input data $D_{IN}$ of the joint module 2, the first monitoring signal and the second monitoring signal can be called the first arm monitoring signal and the second arm monitoring signal. Likewise, the synchronization signal can be called the arm synchronization signal. Thereby, the input data $D_{IN}$ received by the joint module 2 are the first arm monitoring signal or the second arm monitoring signal used for adjusting the driving on the motor machine. The rest technical contents of the embodiment in FIG. 3 are similar to the embodiment in FIG. 2. Hence, the details will not be repeated.

Figure 4:
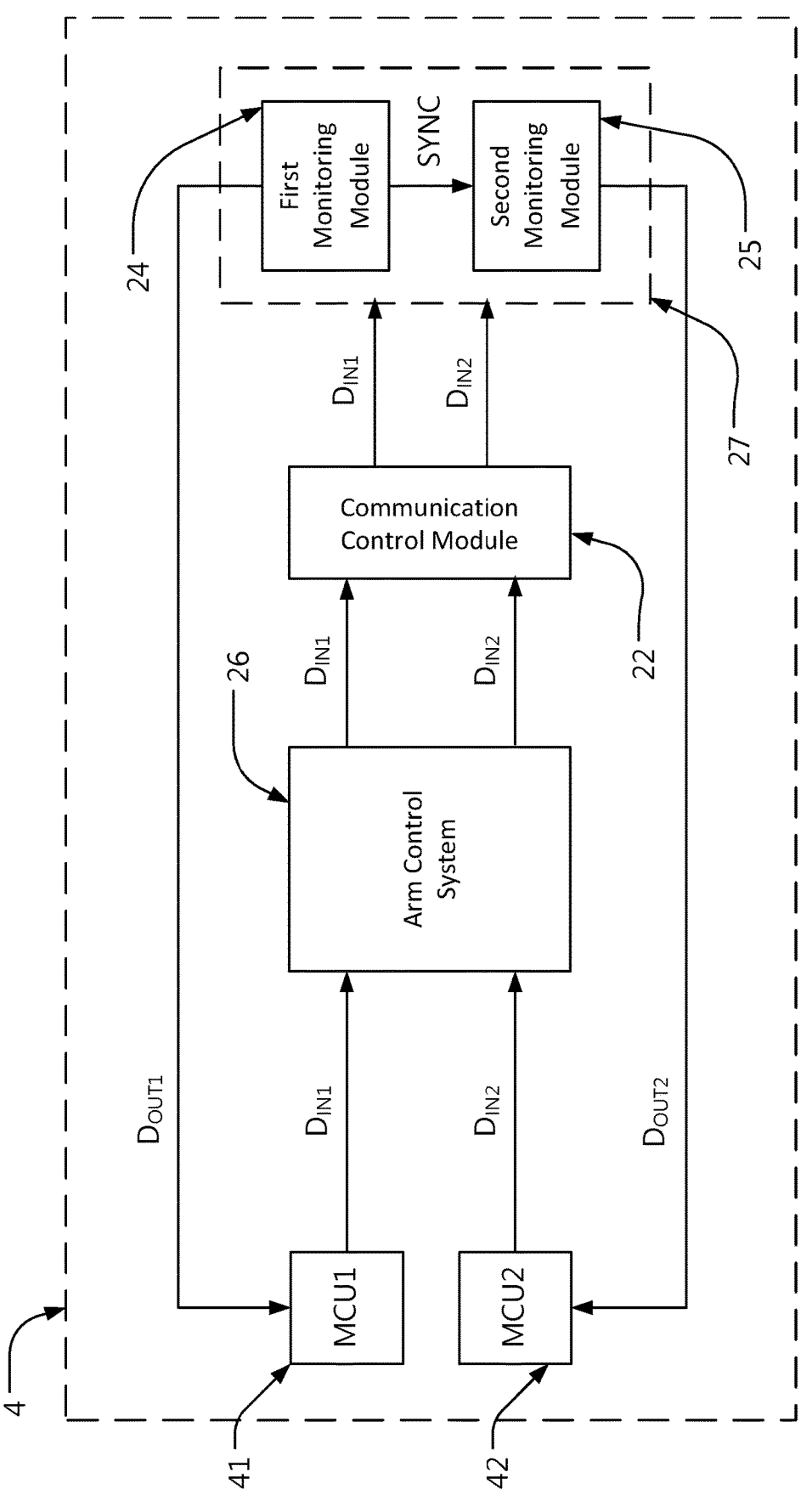
FIG. 4 shows a second circuit diagram of the control system and the safety system of the arm controller according to the present application.

Please refer to FIG. 4, which shows a second circuit diagram of the control system and the safety system of the arm controller according to the present application. The difference between the embodiment in FIG. 4 and the one in FIG. 3 is that, the first monitoring module 24 and the second monitoring module 25 according to the embodiment in FIG. 4 are coupled to the first microprocessor 41 and the second microprocessor 42, respectively, for transmitting the first output data $D_{OUT1}$ and the second output data $D_{OUT2}$ to the first microprocessor 41 and the second microprocessor 42 directly. The rest technical contents of the embodiment in FIG. 4 are similar to the embodiment in FIG. 3. Hence, the details will not be repeated.

Figure 5:
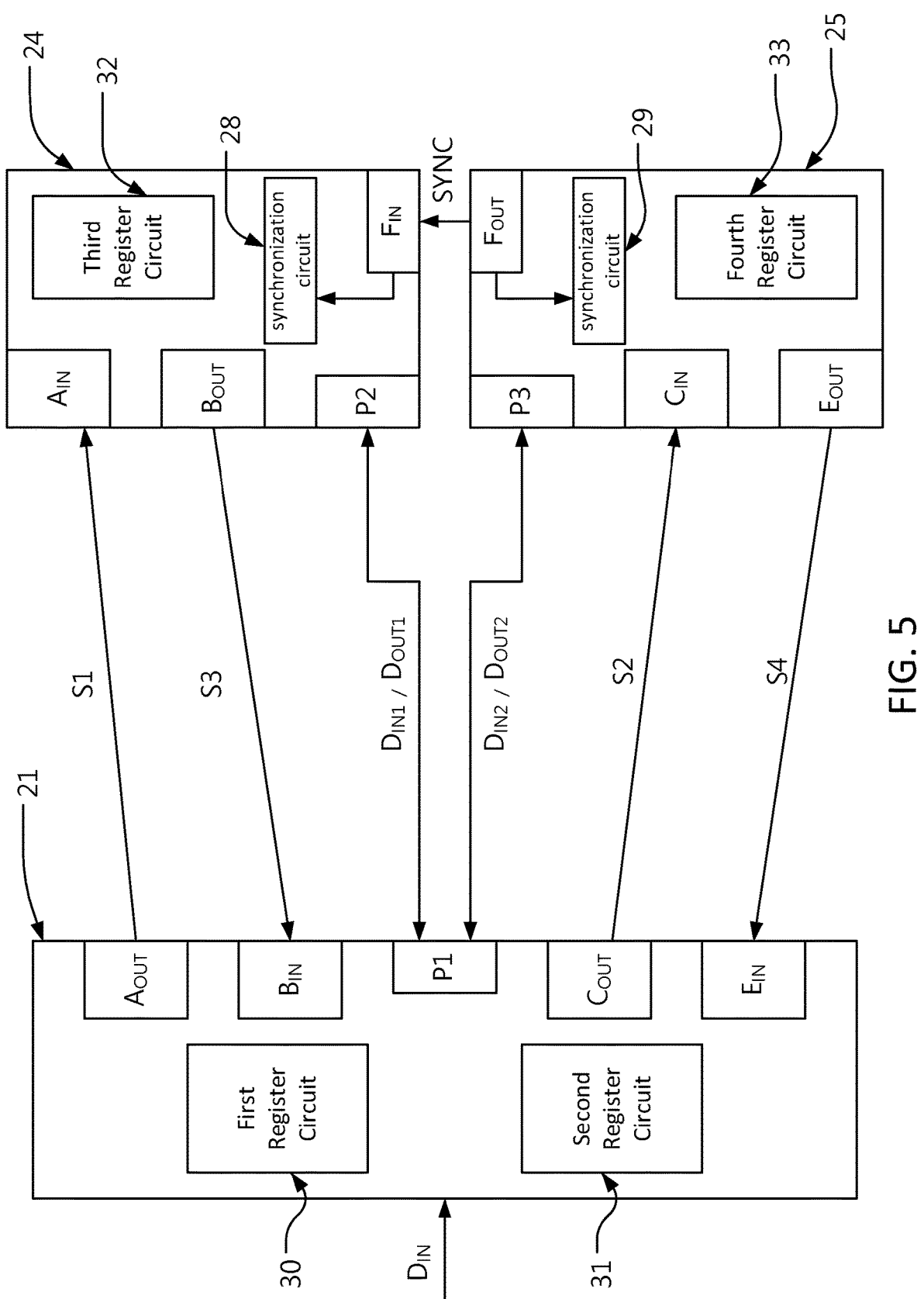
FIG. 5 shows a first circuit diagram of the control system and the safety system according to the present application.

Please refer to FIG. 5, which shows a first circuit diagram of the control system and the safety system according to the present application. By taking the joint module 2 for example, the joint control system 21, the first monitoring module 24, and the second monitoring module 25 all comprise register circuits. Thanks to the dual-channel architecture, the joint control system 21 comprises a first register circuit 30 and a second register circuit 31. The first monitoring module 24 and the second monitoring module 25 comprise a third register circuit 32, a fourth register circuit 33, respectively. Besides, in addition, the communication control module 22 can be a single module independently according to the embodiments in FIGS. 2~4, and the communication control module 22 further can be distributed to the joint control system 21, the first monitoring module 24, and the second monitoring module 25, as shown in the embodiment in FIG. 5. As shown in the figure, the communication control module 22 can comprise the A input circuit $A_{IN}$, the A output circuit $A_{OUT}$, the B input circuit $B_{IN}$, the B output circuit $B_{OUT}$, the C input circuit $C_{IN}$, the C output circuit $C_{OUT}$, the E input circuit $E_{IN}$, the E output circuit $E_{OUT}$, the F input circuit $F_{IN}$, the F output circuit $F_{OUT}$, and three communication ports P1, P2, P3.

Accordingly, the joint control system 21 is coupled to the arm controller 4 for receiving the input data $D_{IN}$ (namely, the first arm monitoring signal or the second arm monitoring signal) for registering the first arm monitoring signal or the second arm monitoring signal to the first register circuit 30 or the second register circuit 31. The joint safety system 23 is coupled to the joint control system 21 for receiving the first arm monitoring signal or the second arm monitoring signal according to a first joint interrupt signal S1 or a second joint interrupt signal S2 and controlling the operation of the joint module 2. Next, the joint safety system 23 monitors the operation of the joint module 2 according to the synchronization signal SYNC (namely, the joint synchronization signal), and generates and registers the first joint monitoring signal and the second joint monitoring signal to the third/fourth register circuits 32, 33 for acquiring the operation of the joint module 2. Afterwards, the joint control system 21 receives sequentially the first joint monitoring signal and the second joint monitoring signal from the joint safety system 23 according to a third joint interrupt signal S3 or a fourth joint monitoring signal S4. The joint control system 21 can transmit the output data $D_{OUT}$ (the first joint monitoring signal and the second joint monitoring signal) to the arm controller 4. The signal transmissions of joint control system 21 and the joint safety system 23 as described above are transmitted via the communication ports P1, P2 to each other or via the communication ports P1, P3 to each other. The first monitoring module 24 and the second monitoring module 25 can transmit signals to the joint control system 21 sequentially or simultaneously.

Please refer to FIG. 5 again. The first to the fourth joint interrupt signals S1~S4 are transmitted from the A output circuit $A_{OUT}$ to the A input circuit $A_{IN}$, from the C output circuit $C_{OUT}$ to the C input circuit $C_{IN}$, from the B output circuit $B_{OUT}$ to the B input circuit $B_{IN}$, and from the E output circuit $E_{OUT}$ to the E input circuit $E_{IN}$, respectively, for notifying and triggering signal transmissions. Likewise, the synchronization signal SYNC is transmitted from the F output circuit $F_{OUT}$ to the F input circuit $F_{IN}$ for triggering the first monitoring module 24 and the second monitoring module 25 to monitor the electrical properties and operating status of the mechanic equipment at the same monitoring time. The first monitoring module 24 can trigger the second monitoring module 25. Alternative, the second monitoring module 25 can trigger the first monitoring module 24. In addition, the triggering of the joint safety system 23 can also be performed by the first joint interrupt signal S1 or the second joint interrupt signal S2. That is to say, after the first joint interrupt signal S1 or the second joint interrupt signal S2 triggers the synchronization signal SYNC (the joint synchronization signal), the joint safety system 23 is controlled to monitor the operation of the joint module 2. In other words, the first joint interrupt signal S1 (or the second joint interrupt signal S2) can be used for controlling the joint control system 21 to output signals and controlling the joint safety system 23 to monitor the mechanic equipment simultaneously. The above embodiments are only examples of the present application; they are not used to limit the practice of the present application.

Moreover, when the control system and the safety system are disposed in the arm controller 4, they are the arm control system and the arm safety system; the interrupt signals can be named as arm interrupt signals; and the synchronization signal can be named as the arm synchronization signal. Thereby, the arm control system 26 receives a first system monitoring signal or a second system monitoring signal for registering the first system monitoring signal or the second system monitoring signal. If the monitoring signal is provided from the joint module 2, the first system monitoring signal or the second system monitoring signal can be called the first joint monitoring signal and the second joint monitoring signal. The differences are only the names, not influencing the operation of the arm control system 26. The arm control system 26 is coupled to the arm safety system 27. The arm safety system 27 receives the first system monitoring signal or the second system monitoring signal according to a first arm interrupt signal or a second arm interrupt signal for controlling the operation of the robotic arm 1. The arm safety system 27 monitors the operation of the robotic arm 1 according to the arm synchronization signal and generates the first arm monitoring signal and the second arm monitoring signal. Likewise, the first arm interrupt signal (or the second arm interrupt signal) can trigger the arm synchronization signal for controlling the arm safety system 27 to monitor the operation of the robotic arm 1. The rest description is the same as the description for disposing the control system and the safety system in the joint module 2. Hence, the details will not be repeated.

Figure 6:
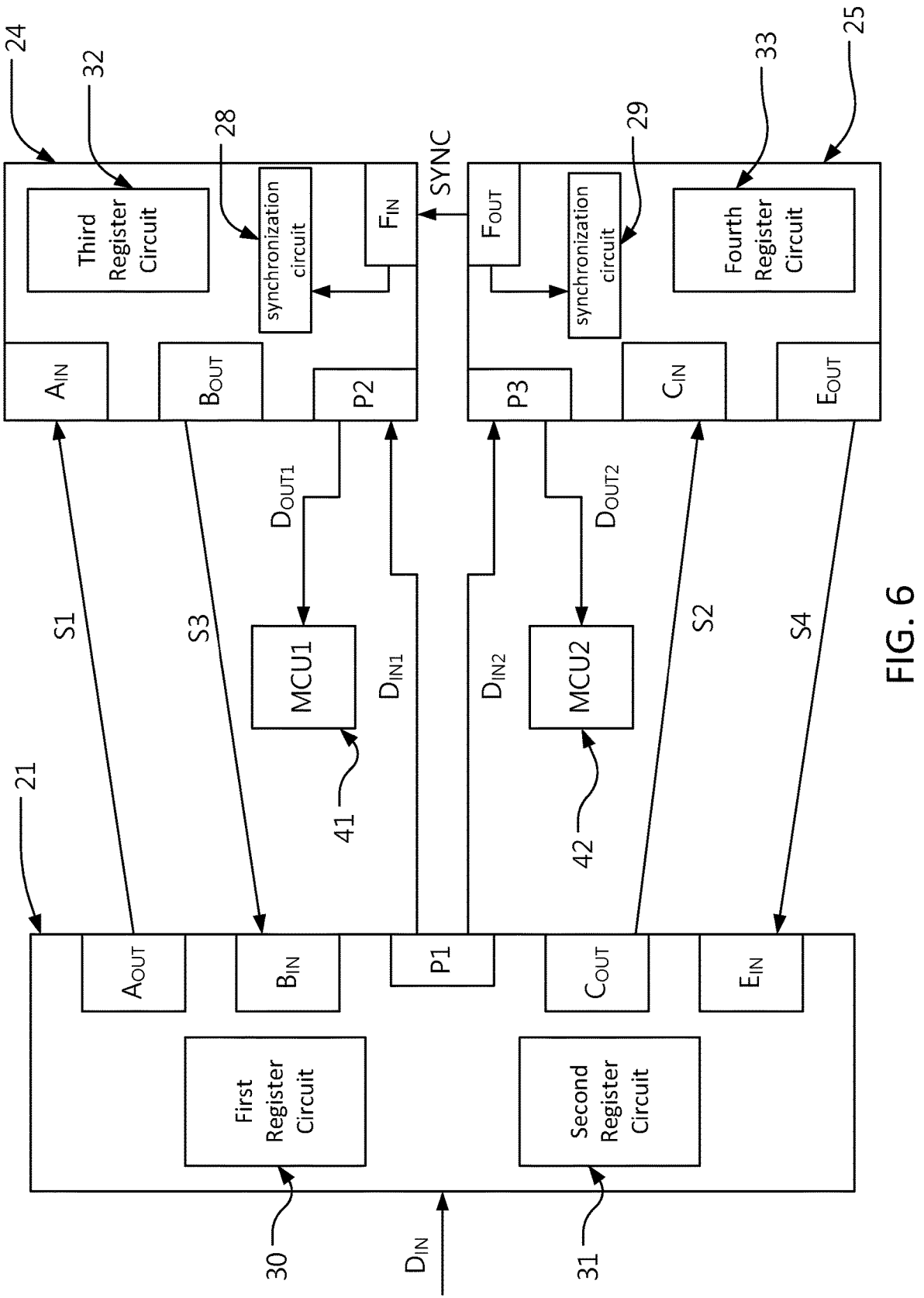
FIG. 6 shows a second circuit diagram of the control system and the safety system according to the present application.

Please refer to FIG. 6, which shows a second circuit diagram of the control system and the safety system according to the present application. The difference between the embodiment in FIG. 6 and the one in FIG. 5 is that, the safety system according to the embodiment in FIG. 6 transmits the monitoring signal to the arm controller 4 directly. In other words, the first monitoring module 24 and the second monitoring module 25 transmit the first monitoring signal and the second monitoring signal to the first microprocessor 41 and the second microprocessor 42 directly.

To sum up, the present mechanic equipment comprises a control system and a safety system. The safety system is coupled to the control system, the safety system monitors the operation of the mechanic equipment and generates a first monitoring signal and a second monitoring signal according to a synchronization signal. The first monitoring signal and the second monitoring signal are acquired by monitoring the mechanic equipment at the same monitoring time.

Alternatively, the control system comprises a first register circuit and a second register circuit for registering the first input data and the second input data, respectively. The communication control module controls the control system to output the first input data or the second input data. The safety system comprises a first monitoring module and a second monitoring module. The first monitoring module is coupled to the first register circuit and the second monitoring module is coupled to the second register circuit via a communication port for receiving the first input data and the second input data sequentially. The first monitoring and the second monitoring module comprise a synchronization circuit, respectively. The synchronization signal controls the synchronization circuit to trigger the first monitoring module and the second monitoring module to monitor the status of the mechanic equipment at the same monitoring time and generate the first monitoring signal and the second monitoring signal. The safety system outputs the first output data and the second output data according to the first monitoring signal and the second output signal.

The foregoing description is only embodiments of the present application, not used to limit the scope and range of the present application. Those equivalent changes or modifications made according to the shape, structure, feature, or spirit described in the claims of the present application are comprised in the appended claims of the present application.

The invention claimed is:

1. A Mechanic equipment, comprising:

a control system; and a safety system, coupled to said control system, monitoring an operation of said mechanic equipment, generating a first monitoring signal and a second monitoring signal according to a synchronization signal, and said first monitoring signal and said second monitoring signal acquired by monitoring said mechanic equipment at the same monitoring time;

wherein said mechanic equipment is a robotic arm, and an arm controller of said robotic arm comprises said control system and said safety system;

said control system is an arm control system, said safety system is an arm safety system;

said arm control system registers a first system monitoring signal or a second system monitoring signal; said arm control system is coupled to said arm safety system, said arm safety system receives said first system monitoring signal or said second system monitoring signal according to a first arm interrupt signal or a second arm interrupt signal for controlling the operation of said robotic arm;

said synchronization signal is an arm synchronization signal; and said arm safety system monitors the operation of said robotic arm according to said arm synchronization signal for generating a first arm monitoring signal and a second arm monitoring signal; and said first arm interrupt signal or said second arm interrupt signal triggers said arm synchronization signal for controlling said arm safety system to monitor the operation of said robotic arm.

2. A mechanic equipment, comprising:

a control system; and a safety system, coupled to said control system, monitoring an operation of said mechanic equipment, generating a first monitoring signal and a second monitoring signal according to a synchronization signal, and said first monitoring signal and said second monitoring signal acquired by monitoring said mechanic equipment at the same monitoring time;

wherein said mechanic equipment is a robotic arm, and each joint module of said robotic arm comprises said control system and said safety system;

said control system is a joint control system, said safety system is a joint safety system; said joint control system registers a first system monitoring signal or a second system monitoring signal;

said joint control system is coupled to said joint safety system, said joint safety system receives said first system monitoring signal or said second system monitoring signal according to a first joint interrupt signal or a second joint interrupt signal for controlling the operation of said joint module;

said synchronization signal is a joint synchronization signal, and said joint safety system monitors the operation of said joint module according to said joint synchronization signal for generating a first joint monitoring signal and a second joint monitoring signal and acquiring the operation status of said joint module; and said first joint interrupt signal or said second joint interrupt signal triggers said joint synchronization signal for controlling said joint safety system to monitor the operation of said joint module.

3. A mechanic equipment, comprising:

a control system, comprising a first register circuit and a second register circuit, registering a first input data and a second input data, respectively;

a communication control module, controlling said control system to output said first input data or said second input data;

a safety system, coupled to said control system, monitoring an operation of said mechanic equipment, generating a first monitoring signal and a second monitoring signal according to a synchronization signal, and said first monitoring signal and said second monitoring signal acquired by monitoring said mechanic equipment at the same monitoring time, said safety system, comprising a first monitoring module and a second monitoring module;

wherein said first monitoring module coupled to said first register circuit and said second monitoring module coupled to said second register circuit via a communication port for receiving said first input data and said second input data sequentially; said first monitoring module and said second monitoring module comprise a synchronization circuit, respectively;

said synchronization signal controls said synchronization circuit to trigger said first monitoring module and said second monitoring module to monitor the status of said mechanic equipment at the same monitoring time and generate said first monitoring signal and said second monitoring signal; and said safety system outputs said first output data and said second output data according to said first monitoring signal and said second output signal.

* * * * *